United States Patent
Sugaya et al.

(10) Patent No.: US 6,804,209 B1
(45) Date of Patent: Oct. 12, 2004

(54) WIRELESS COMMUNICATION CONTROL METHOD AND WIRELESS TRANSMISSION APPARATUS

(75) Inventors: Shigeru Sugaya, Kanagawa (JP); Hidemasa Yoshida, Chiba (JP); Takanobu Kamo, Kanagawa (JP); Takehiro Sugita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/429,477

(22) Filed: Oct. 29, 1999

(30) Foreign Application Priority Data

Oct. 30, 1998 (JP) .......................................... P10-311302

(51) Int. Cl.$^7$ ................................................ H04Q 7/00
(52) U.S. Cl. ....................... 370/328; 370/256; 370/338; 370/441; 455/509
(58) Field of Search ......................... 370/319, 328–331, 370/338–346, 350, 256, 329, 335, 342, 441, 480; 455/509, 507, 561, 517, 524

(56) References Cited

U.S. PATENT DOCUMENTS

| | | | |
|---|---|---|---|
| 5,448,570 A | | 9/1995 | Toda et al. ................. 370/95.3 |
| 5,673,031 A | * | 9/1997 | Meier |
| 5,784,368 A | | 7/1998 | Weigand et al. ............ 370/310 |
| 5,870,385 A | * | 2/1999 | Ahmadi et al. |
| 5,940,771 A | * | 8/1999 | Gollnick et al. |
| 2002/0085503 A1 | * | 7/2002 | Hulkyalkar et al. ........ 370/252 |

OTHER PUBLICATIONS

Haartsen, J.: "Bluetooth—The Universal Radio Interface for Ad Hoc, Wireless Connectivity" ON—Ericsson Review, Ericsson, Stockholm, SE, No. 3, 1998, pp. 110–117, XP000783249 ISSN: 0014–0171.

* cited by examiner

Primary Examiner—Afsar Qureshi
(74) Attorney, Agent, or Firm—Jay H. Maioli

(57) ABSTRACT

In a wireless transmission control method for controlling wireless communication access among a plurality of communication stations via wireless transmission of a control signal from a central control station to a terminal station, a communication station selected as the central control station judges a station with which each terminal station in a wireless network is capable of directly making communication. When it is detected that each terminal station is capable of directly making communication with a communication station having many more stations than those directly making wireless communication with the central control station, processing for changing the detected terminal station to the central control station is performed. Thus, when the control station is set and the access management of wireless communication is carried out under the control of the control station, the control station can be selected easily and satisfactorily.

6 Claims, 13 Drawing Sheets

Frame Configuration

Management Area Configuration

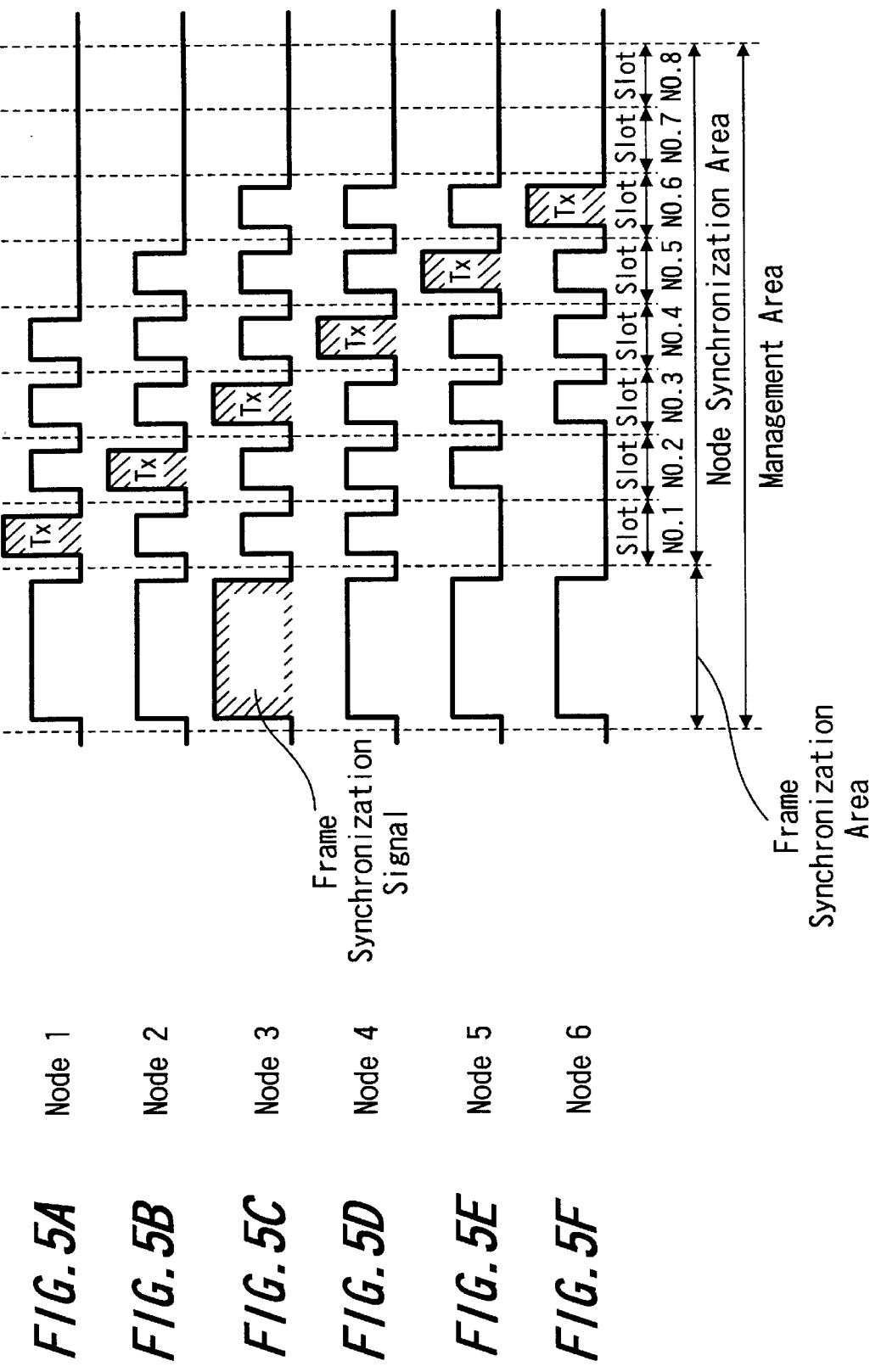

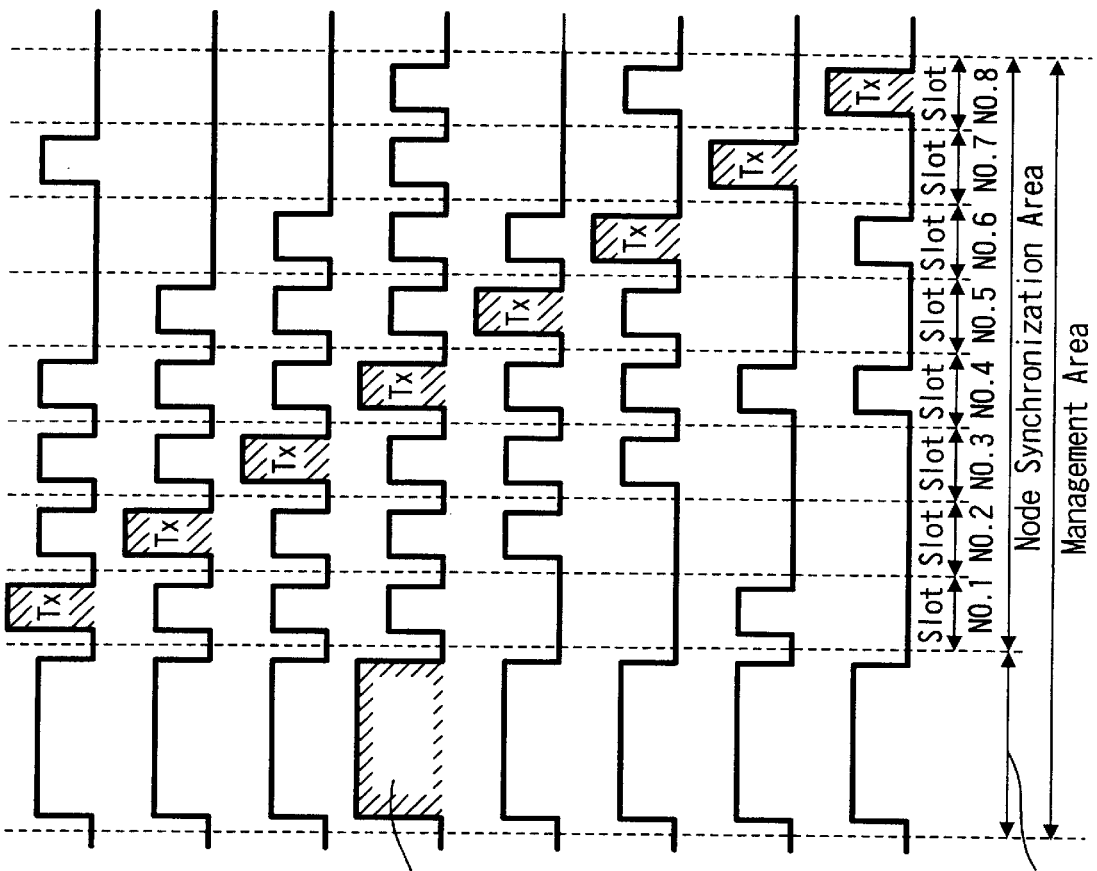

WIRELESS COMMUNICATION CONTROL METHOD AND WIRELESS TRANSMISSION APPARATUS

BACKGROUND OF THE INVENTION

1. Field of the Invention

The present invention relates to a wireless communication control method preferably applied to such a case where various information is transmitted by means of a wireless signal, for example, to construct a local area network (LAN) among a plurality of devices, and a wireless transmission apparatus using this control method.

2. Description of the Related Art

Conventionally, in a relatively small range such as home, office or the like, when a local area network is constructed between a plurality of devices such as various image devices, personal computer machine and its peripheral devices and so on so as to make it possible to transmit data handled by these devices, a wireless signal transmitter/receiver (a wireless transmission apparatus) is connected to each device so as to enable data transmission through wireless transmission, instead of direct connection between respective devices via a signal line.

A local area network is constructed through wireless transmission, thereby making it possible to simplify a system configuration without requiring direct connection between respective devices via a signal line or the like.

In the meantime, in the case where a local area network is constructed by preparing a plurality of wireless transmission apparatuses, if signals are transmitted simultaneously from a plurality of transmission apparatuses, there may be a possibility that a transmission error occurs. Thus, communication between respective transmission apparatuses in the network is required to be access-controlled by means of any method.

As a conventionally known access control method, for example, in a small scale wireless network, there is exemplified a method for unitarily managing communication between respective transmission apparatuses (terminal stations: nodes) in the network by means of a transmission apparatus (a central control station: a route node) being a central part in a start-type connection. For example, there is a method for managing communications in a network by means of polling control. In this method, a central control station in a network transmits a control signal for performing polling sequentially to another node in the network so that the transmission from each node is performed sequentially by means of polling. This polling transmission processing is performed, thereby making it possible to improve transmission efficiency.

However, in the case where a wireless network is constructed via such star-type connection in which a central control station has been allocated, it is required that the central control station must be a station which is capable of directly making wireless communication with all terminal stations in the wireless network. If there exists a station which can not receive a signal to be transmitted from the central control station directly, it is difficult for the terminal station to receive a polling control signal to be transmitted from the central control station, and there exists a terminal station incapable of polling control. Therefore, it is important to select and allocate a central control station when such wireless network is constructed; and there has been a problem that it cannot be easily determined as to which station is selected as the central control station.

In addition, after a central control station has been determined in a conventional wireless network system once, in the case where a terminal station is newly allocated, there has been a problem that the terminal station can be allocated only at a position capable of directly making wireless communication with the central control station. That is, even if a terminal station is allocated at a position incapable of wireless communication with the central control station, that terminal station is incapable of receiving a polling control signal or the like from the central control station. After all, the terminal station is incapable of performing transmission.

SUMMARY OF THE INVENTION

An object of the present invention is to easily and properly select a control station when the control station is set, and wireless communication access management is performed under the control of the control station.

As a first aspect of the present invention, there is provided a wireless communication control method for controlling an access of wireless communication between a plurality of communication stations via wireless transmission of a control signal from a control station to a terminal station, in which a communication station selected as a central control station judges a station with which each terminal station in a wireless network is capable of directly making wireless communication; and when it is detected that said each terminal station is capable of making wireless communication with communication stations having many more terminal stations than stations capable of directly making wireless communication with the central control station, a processing for changing the detected terminal station to a central control station is performed.

According to the first aspect of the present invention, there is provided a wireless transmission control method, wherein a station suitable to control each communication station in a wireless network is automatically selected as a central control station.

As a second aspect of the present invention, there is provided a wireless communication control method, wherein after authentication processing for participation has been executed via wireless transmission so as to be connected to an existing wireless network configured under the control of a central control station, in the case where it is judged that the corresponding wireless network does not exist all over available frequency bandwidths, an own station becomes a central control station to set a wireless network.

According to the second aspect of the present invention, there is provided a wireless transmission control method, wherein in the case where there is no other communication station acting as a central control station in the neighborhood, an own station is automatically set to a central control station, making it possible to construct a wireless network.

As the first aspect of the present invention, there is provided a wireless transmission control apparatus for controlling wireless communication at a terminal station in a network, which comprises a communicating means for wireless-transmitting control information for controlling transmission of a radio signal from said terminal station and for receiving a wireless signal transmitted from the terminal station, and a control means for judging a wireless communication state at a terminal station in the network based on a received predetermined signal by said communicating means, and performing transmission control of control information for moving a transmission function of said control information to any terminal station in the network based on the judged communication state.

According to the wireless transmission apparatus of the present invention, when this transmission control apparatus acts as a central control station, if it is judged as to the presence of a station suitable as be a central control station rather than the own station, processing for moving the control function to that station is executed.

As the second aspect of the present invention, there is provided a wireless transmission control apparatus in which wireless communication is performed under the control of a control station in a wireless network, which comprises a communicating means for receiving control information from the control station and transmitting prepared information based on the control information; and a control means for, when the communicating means cannot receive the control information all over available frequency bandwidths by a system, an own station is set as a control station for transmitting control information from the communication means.

According to the second aspect of the present invention, there is provided the wireless transmission control apparatus, wherein in the case where there is no other communication station acting as a central control station in the neighborhood, processing for an own station to be automatically set to a central control station is executed.

BRIEF DESCRIPTION OF THE DRAWINGS

FIGS. 5(A–F) is an explanatory view showing a transmission state in an management area for each node according to one embodiment of the present invention;

FIGS. 15(A–H) is an explanatory view showing a state of transmission in the management area for each node after control station change according to one embodiment of the present invention.

DESCRIPTION OF THE PREFERRED EMBODIMENTS

Hereinafter, an embodiment of the present invention will be described with reference to the accompanying drawings.

Figure 1:
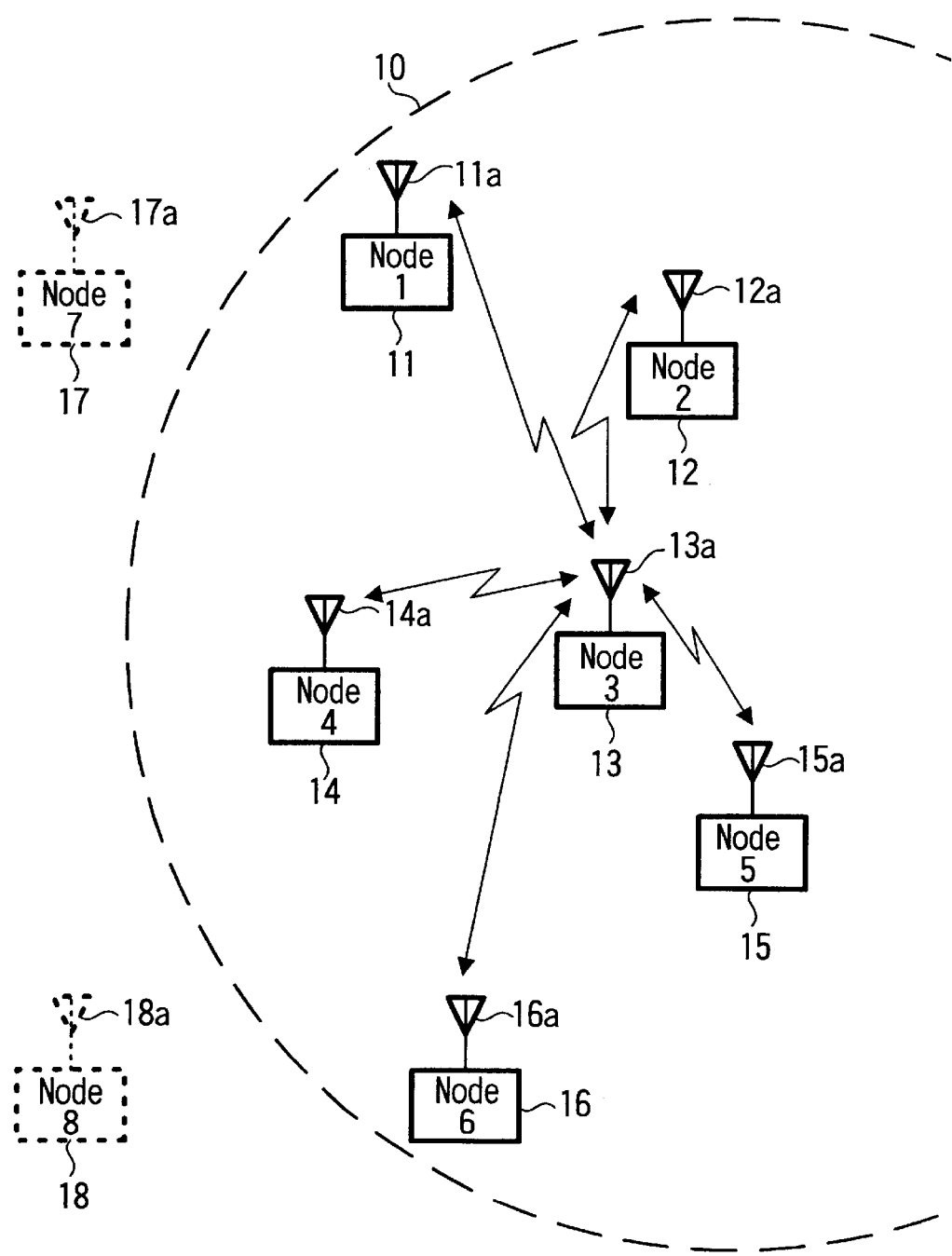
FIG. 1 is an explanatory view showing a network setting example according to one embodiment of the present invention.

In this example, the present invention is applied to a network system constructed as a system for transmitting and receiving image data, voice data, computer-use data or the like at home or in a relatively small office or the like. First of all, a system configuration of this embodiment will be described with reference to FIG. 1. In the network system of this embodiment, the maximum number of wireless transmission apparatuses in one network is predetermined. For example, the maximum of 16 wireless transmission apparatuses are available to construct the network in this case. In FIG. 1, there is shown an example when eight wireless transmission apparatuses 11 to 18 are allocated. To these transmission apparatuses 11 to 18, antennas 11a to 18a are connected to perform transmission and receiving, respectively. To each of the wireless transmission apparatuses 11 to 18, various processing devices (not shown) such as an image signal reproducing device, a monitor device, a computer machine, a printer device or the like are individually connected. In the case where data transmission is required between these processing devices, data is transmitted via a connected wireless transmission apparatus.

Here, of the eight wireless transmission apparatuses 11 to 18, six wireless transmission apparatuses 11 to 16 are active, and the remaining two wireless transmission apparatus 17 and 18 are inactive (for example, in a state in which power is not applied thereto). The eight wireless transmission apparatuses 11 to 18 functions as nodes being communication stations, and first to eighth nodes are individually addressed.

In this case, a system configuration is such that arbitrary one wireless transmission apparatus in the network system is set as a route node (a central control station) that functions as a control station, and wireless communication between nodes is executed based on controls such as polling control or the like from this route node. As the route node, there is basically used a wireless transmission apparatus allocated at a position capable of directly making wireless communication with all other communication stations in the system. Processing for a wireless transmission apparatus to be selected as the route node will be described later in detail. Shown here is a so-called star-type connection structure such that in the six wireless transmission apparatuses being active, the wireless transmission apparatus 13 serving as a third node allocated at a position capable of directly making wireless communication with all other nodes is selected as a central control station capable of directly communicating with all other nodes; a region which can make it possible to directly communicate with this wireless transmission apparatus 13 is defined as a network area 10; and other nodes in the network area 10 are controlled from the central control station.

Figure 2:
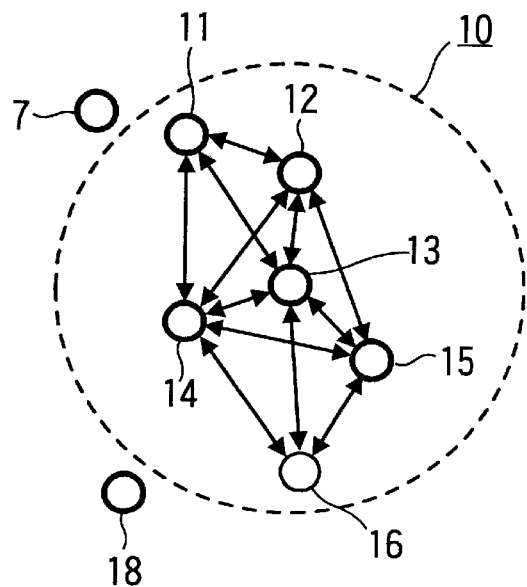
FIG. 2 is an explanatory view showing an example of a topology map according to one embodiment of the present invention.

At each node in the area 10 set around the wireless transmission apparatus 13 being a central control station (a third node), when a state of nodes capable of direct communication is shown as a topology map, it is presumed to be a state shown in FIG. 2. Direct communication is possible between nodes connected by an arrow in FIG. 2. That is, the third node is capable of directly making wireless communication with all the nodes (terminal stations) in the area 10. With respect to the nodes other than central control station, it is presumed that a node acting as a terminal station is capable of directly making wireless communication between nodes at a relatively close place.

Figure 3:
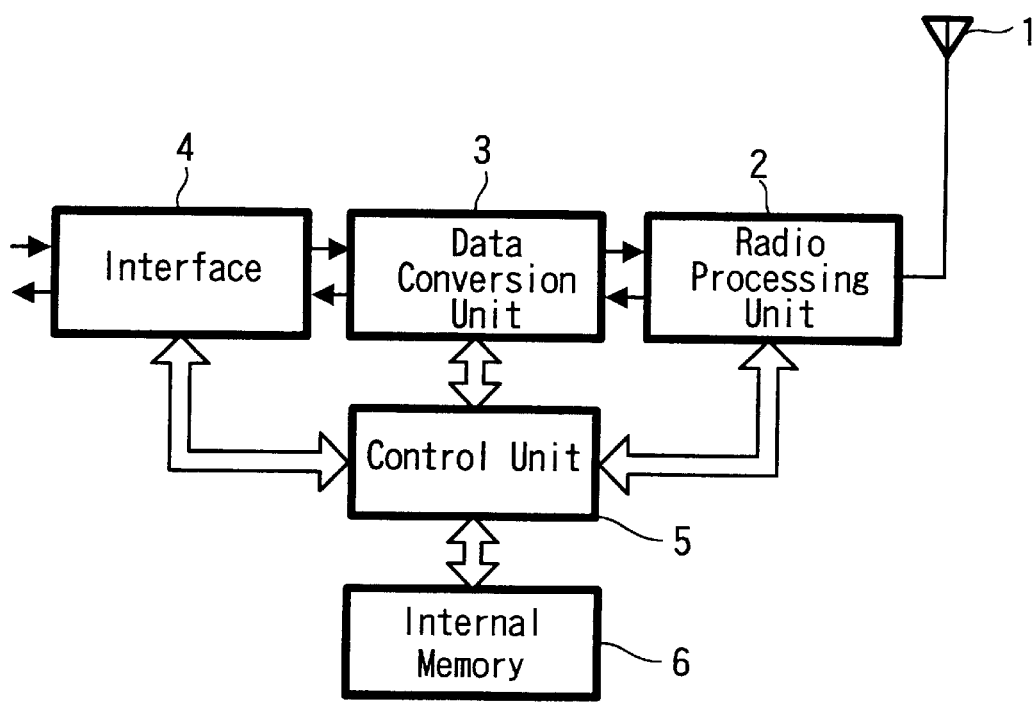
FIG. 3 is a block diagram showing an example of a configuration of transmission apparatuses according to one embodiment of the present invention.

FIG. 3 shows a structural example of wireless transmission apparatuses 11 to 18 configuring the respective nodes. In this case, each of the wireless transmission apparatuses 11 to 18 is basically common in structure. Each of the transmission apparatuses is provided with an antenna 1 performing transmission and reception; and a radio processing unit 2 connected to this antenna 1 and performing wireless transmission processing and wireless reception processing, enabling wireless communication between another transmission apparatus. In this case, as a frequency to be transmitted and received by the radio processing unit 2 of this example, a very high frequency bandwidth (for example, 5 GHz bandwidth) is used. In the case of this example, a relatively weak transmission output is set. For example, for interior use, an output is set to an extent such that wireless transmission is possible within a distance from several meters to several tens of meters.

There is provided a data conversion unit 3 for performing data conversion of a signal received by the radio processing unit 2 and a signal transmitted by the radio processing unit 2. The converted data by the data conversion unit 3 is supplied to a processor connected via an interface unit 4, and the data to be supplied from the connected processor is supplied to the data conversion unit 3 via the interface unit 4, enabling conversion processing.

Each unit in the wireless transmission apparatus is configured to execute processing under the control of a control unit 5 configured by a micro-computer or the like. In this case, when the radio processing unit 2 receives a control signal, the received control signal is supplied to the control unit 5 via the data conversion unit 3, and the control unit 5 sets each unit in a state indicated by the received control signal. In addition, a control signal to be transmitted from the control unit 5 to other transmission apparatus is supplied from the control unit 5 to the radio processing unit 2 via the data conversion unit 3, thereby causing wireless transmission. An internal memory 6, storing a program or the like necessary as the wireless transmission apparatus of the central control station and the terminal station, is connected to the control unit 5. In addition, data required for communication control is temporarily stored in the internal memory 6.

Figures 4A, 4B:
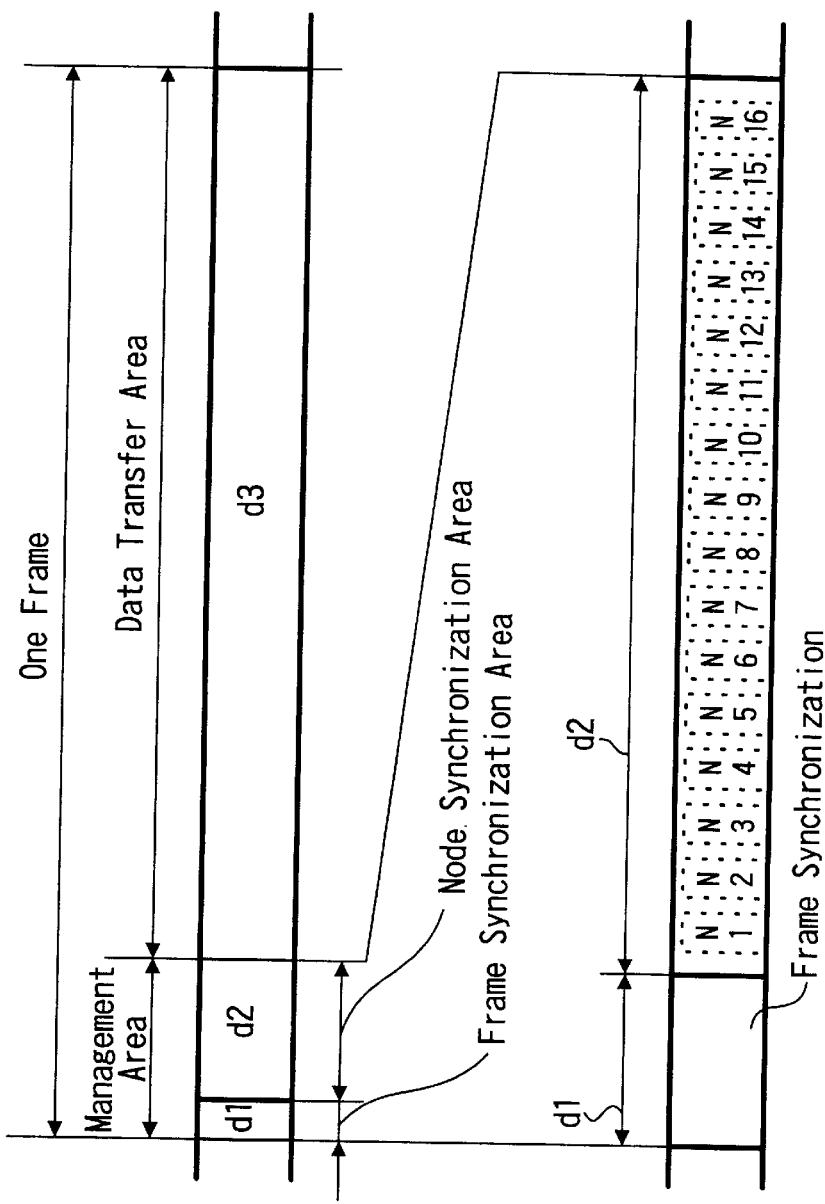
FIGS. 4(A–B) is an explanatory view showing a transmission data configuration example according to one embodiment of the present invention.

FIG. 4 shows a configuration of signals to be transmitted between nodes (wireless transmission apparatuses 11 to 16) in the network system of the shown embodiment. In this embodiment, the network system is configured such that a frame period is specified, and data is transmitted. That is, as shown in A of FIG. 4, one-frame interval is specified by a predetermined interval. At the head part of the one-frame interval, a frame synchronization area d1 and a node synchronization area d2 being a management data transmission region are defined by predetermined intervals, respectively, and the remaining interval is defined as a data transfer (transmission) area d3. In the frame synchronization area d1, as shown in B of FIG. 4, a frame synchronization signal is transmitted from a route node. This frame synchronization signal is received by the other node, and frame periods are set in all nodes based on a reception timing of the synchronization signal. The frame synchronization signal is composed of predetermined bits of data. For example, ID number data specific to a network system (network ID) is given.

In the node synchronization area d2, a predetermined number of slots (in this case, 16) are set at an equal interval, and 16 slots in such one frame are allocated respectively to 16 communication stations in this network system. These allocated slots include, for example, a slot N1 for a first node, a slot N2 for a second node, . . . a slot N16 for a sixteenth node in ascending order. These slots N1 to N16 assigned to the respective nodes transmit a node synchronization signal from the nodes corresponding to the slots. Here, since the network system is composed of eight nodes, the slots N1 to N8 are used, and the slot N9 and subsequent are not used (i.e., data is not transmitted). Data (node ID) of the address number assigned to each node is given to the node synchronization signal.

The node synchronization signal to be transmitted at each slot in this node synchronization area d2 is received at each communication station in the network system. The transmission processing and receiving processing of the node synchronization signal will be described later.

In the data transfer area d3, data transfer (transmission) processing is performed between respective nodes based on an access control of a route node. The access control by this route node is executed by means of polling control from the route node, for example. In this polling control processing, respective nodes are called in order from the route node by a polling response request signal, and transmission is sequentially executed for each node.

In the node whose address is specified by the polling response request signal, when data to be transmitted is present, data transmission processing is performed immediately after the polling response request signal has been received. As the transmission processing at this time, it is considered that, for example, data transfers in an asynchronous (non-synchronous) transfer mode and aisochronous (synchronous) transfer mode are used depending on type of data to be transmitted. With respect to the asynchronous and aisochronous transfer modes, for example, the asynchronous transfer mode is used for transmission of relatively short data such as control data or the like; and the aisochronous transfer mode is used for transmission of data requiring real-time transfer such as image data, voice data or the like.

Next, the transmission processing and receiving processings of the frame synchronization signal and the node synchronization signal in the management area for each frame will be described with respect to FIG. 5. As described above, 16 slots are provided in the node synchronization area d2. Hereinafter, for simplification of explanation, it is assumed that eight slots from the first slot to the eighth slot are provided, and these eight slots are individually allocated for eight nodes, i.e., the first node to the eighth node.

In FIG. 5, A to F each shows a communication state at six nodes (first node to sixth node) set in a communication enable state in order. In FIG. 5, the range marked with diagonal line designates as follows: Transmission processing is performed at the radio processing unit 2 that is the transmitting means of that node, and wireless transmission is done from the antenna 1. At the other pulse-shaped leading interval, the transmitted signal from another node is properly received at the radio processing unit 2 that is the receiving means of that node. At an interval free of pulse-shaped leading, a signal cannot be properly received (i.e., data cannot be decoded correctly by attempting reception).

In the third node which is selected as a central control station (route node), as shown in A of FIG. 5, a frame synchronization signal is transmitted at an interval of the node synchronization area d1. At an interval of the node synchronization area d2, transmission processes Tx of node synchronization signals are performed at an interval set as a third slot (in slot 3). Reception processing is performed in the other slots (first slot, second slot, and from fourth slot to eighth slot).

A frame synchronization signal to be transmitted at this time includes synchronization data required for frame synchronization processing; data on the identification number specific to this network system; and topology map data in the network system. The topology map data is directed to data contained in a topology map previously created by the control unit 5 of the route node and stored in the internal memory 6 (topology map created before one frame when it is created in a one-frame period). The node synchronization signal includes data concerning a communication state at the third node in addition to the address data attached to the third node. At an interval at which the node synchronization signal is received, the node synchronization signals of all of the active nodes (first node, second node, and from fourth node to sixth node) are received, and the data included in the signal can be correctly decoded. However, since nodes (seventh node and eighth node) assigned to the seventh slot and the eighth slot are inactive, data is not received at these slot positions.

In the nodes (first node, second node, and fourth node to sixth node) acting as terminal stations other than central control station, as shown in A, B, D, E, and F of FIG. 5, a frame synchronization signal transmitted from the route node is received at an interval of the frame synchronization area d1, and transmission processing is performed at the frame period indicated by that signal. That is, the control unit 5 of each node is structured of controlling a communication timing (timing setting of each area or slot or the like) based on the reception timing of the frame synchronization signal. Each node in the network system performs communication processing at the same frame period.

In the node synchronization area, a node synchronization signal is received at a slot position assigned to each node, and reception processing is performed at the other slot positions. That is, at the first node, as shown in A of FIG. 5, the transmission processing Tx of the node synchronization signal is performed in a first slot, and reception processing is performed in the second slot to the eighth slot. In the network construction of the topology map shown in FIG. 2, the nodes positioned adjacent to the first node are second, third, and fourth nodes. At the first node, as shown in A of FIG. 5, only the node synchronization signals transmitted to second, third, and fourth slots can be correctly received from these nodes.

At the second node, as shown in B of FIG. 5, transmission processing Tx of the node synchronization signal is performed in a second slot, and reception processing is performed in first and third to eighth slots. In the network of the topology map shown in FIG. 2, the nodes positioned adjacent to a second node are first, third, fourth, and fifth nodes. At the second node, as shown in B of FIG. 5, only the node synchronization signals to be transmitted to the first, third, fourth, and fifth slots from these nodes can be correctly received.

At the fourth node, as shown in D of FIG. 5, transmission processing Tx of the node synchronization signal is performed in a fourth slot, and receiving processing is performed in the first to third and fifth to eighth slots. In the network configuration of the topology map shown in FIG. 2, the nodes positioned adjacent to the fourth node are first, second, third, fifth, and sixth nodes. At the fourth node, as shown in D of FIG. 5, the node synchronization signals to be transmitted to first, second, third, fifth and sixth slots from these nodes can be correctly received.

At the fifth node, as shown in E of FIG. 5, transmission processing Tx of the node synchronization signal is performed in the fifth slot, and receiving processing is performed in first to fourth and sixth to eighth slots. In the network configuration of the topology map shown in FIG. 2, the nodes positioned adjacent to the fifth node are second, third, fourth, and sixth nodes. At the fifth node 5, as shown in E of FIG. 5, the only node synchronization signals to be transmitted to second, third, fourth, and sixth slots from these nodes can be correctly received.

At the sixth node, as shown in F of FIG. 5, transmission processing Tx of the node synchronization signal is performed in the sixth slot, and receiving processing is performed in first to fifth and seventh and eighth slots. In the network configuration of the topology map shown in FIG. 2, the nodes positioned adjacent to the sixth node are third, fourth, and fifth nodes. At the sixth node, as shown in F of FIG. 5, the only node synchronization signals to be transmitted to third, fourth, and fifth slots from these nodes can be correctly received.

In this manner, the transmission processing and the receiving processing are performed in the node synchronization area in the management area for each frame, thereby making it possible to judge which node in the network each node is capable of directly communicating with. The information concerning nodes with which each node is judged as directly communicating is transmitted using the node synchronization signal transmitted from a slot assigned to its own station. Therefore, the node synchronization signals from all terminal stations are received by the central control station, thereby making it possible to judge a communication state at all the stations in the network area. Based on the judged communication state, the topology map shown in FIG. 2 is created, the topology map information is transmitted as a frame synchronization signal in the management area of the next frame, and the topology map is broadcast to each terminal station.

At each terminal station, based on the topology map information, in the case where a remote station to which data is to be transmitted is a station incapable of direct communication, it is judged as to which station should be relayed for transmission or the like.

Communication in this network is carried out in this way. Hereinafter, processing when wireless transmission apparatuses 17 and 18 as the seventh node and the eighth node allocated outside of the network area shown in FIG. 1 become active (for example, power is applied thereto) will be described below. As shown by dashed line of FIG. 6, it is presumed that the wireless transmission apparatus 17 as the seventh node is allocated at a position capable of directly making wireless communication with the first and fourth nodes; and that the wireless transmission apparatus 18 as the eighth node is allocated at a position capable of directly making wireless communication with the fourth and sixth nodes.

Figure 7:
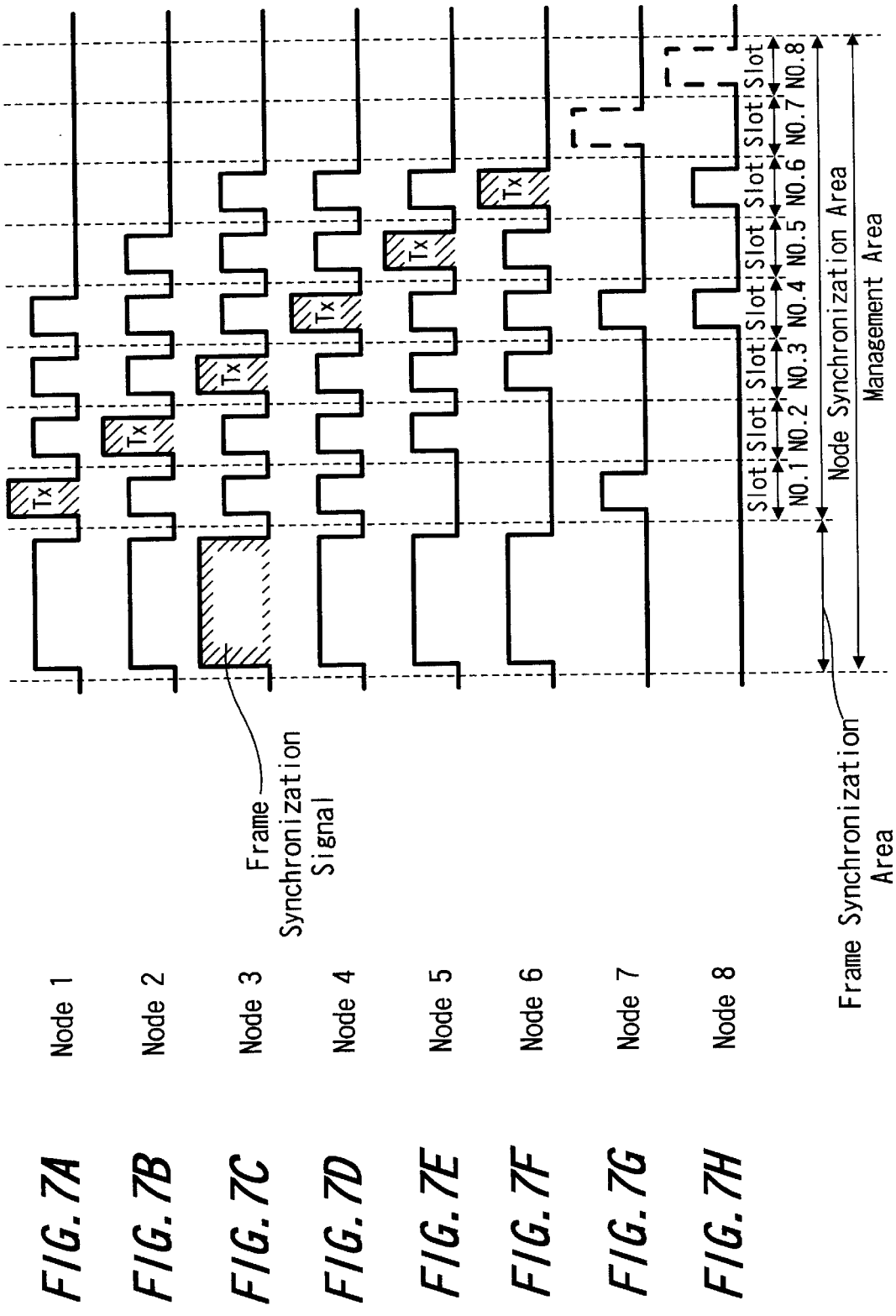
FIGS. 7(A–H) is an explanatory view showing a connection request transmission state according to one embodiment of the present invention.

At this time, in the wireless transmission apparatuses 17 and 18 as the seventh and eighth nodes that desire participation into this network, an attempt is made to receive signals at all channels specified in the network. When this reception is executed, the seventh and eighth nodes receive a synchronization signal to be transmitted from a station capable of directly making communication with the corresponding stations. When a channel undergoing wireless communication in this network is received and when the frame synchronization signal is received, participation processing by the central control station is performed. When the frame synchronization signal cannot be received, the node synchronization signal is received as shown in FIG. 7. That is, A to F of FIG. 7 designate transmission and reception states in the management areas for the first to sixth nodes described in A to F of FIG. 5; and G and H of FIG. 7 designate transmission and reception states in the management area at the seventh and eighth nodes.

In addition, when a plurality of channels receive synchronization signals of the same network, one network may be formed using any one of these channels.

In the wireless transmission apparatus 17 as the seventh node, as shown in G of FIG. 7, a frame synchronization signal cannot be received from a third node, and node synchronization signals from first and fourth nodes corresponding to first and fourth slots can be received. In the wireless transmission apparatus 18 as the eighth node, as shown in H of FIG. 7, a frame synchronization signal cannot be received from a third node; and node synchronization signals from fourth and sixth nodes corresponding to fourth and sixth slots can be received.

When the node synchronization signal is thus received at the seventh and eighth nodes, a slot position to which its own station transmits is judged based on a reception timing of the node synchronization signal and the information contained in the synchronization signal. That is, in the wireless transmission apparatus 17 as the a seventh node, as shown by a dashed line in G of FIG. 7, a node synchronization signal is transmitted at the position of a seventh slot. In the wireless transmission apparatus 18 as the eighth node, as shown by a dashed line in H of FIG. 7, a node synchronization signal is transmitted at the position of an eighth slot. At this time, the node synchronization signal to be transmitted contains desired information for participation into this network.

When the seventh and eighth nodes transmit node synchronization signals, a station (first, fourth, and sixth nodes) capable of receiving the signals from these nodes receives the corresponding node synchronization signal at the seventh slot or eighth slot. In FIG. 7, a timing at which the node synchronization signals are received at these stations is omitted. The station that has received the node synchronization signal from the seventh or eighth node indicates that it has received a node synchronization signal from a station desiring participation into a network based on information contained in the node synchronization signal to be transmitted from the station at the next frame period. When the third node as the central control station has received a node synchronization signal indicating the fact, it is judged as to whether it is proper that the central control station is an own station, and processing for moving the function as the central control station to another terminal station is performed as required.

Figure 8:
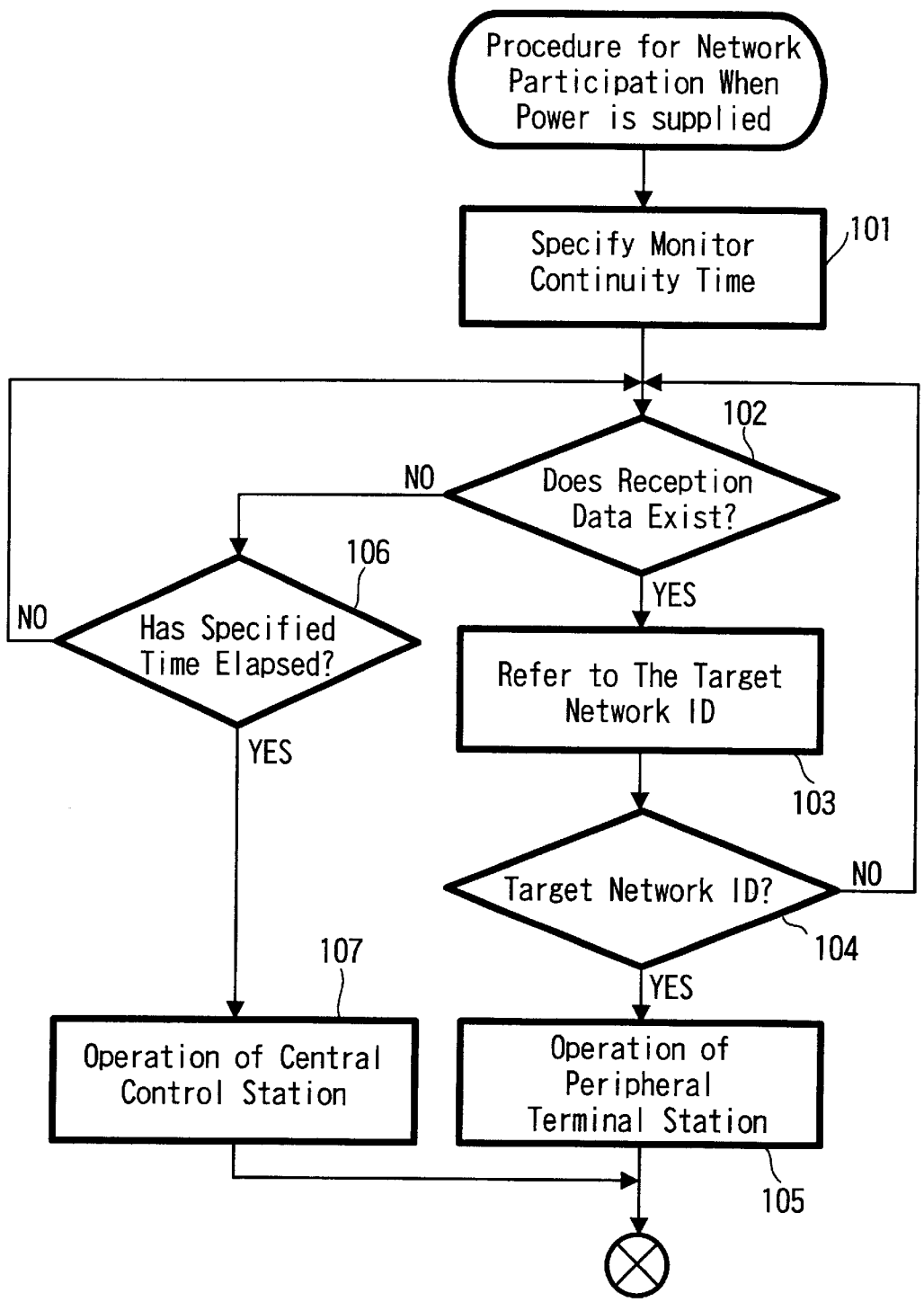
FIG. 8 is a flow chart showing an example of processing for participation into a wireless network according to one embodiment of the present invention.
Figure 9:
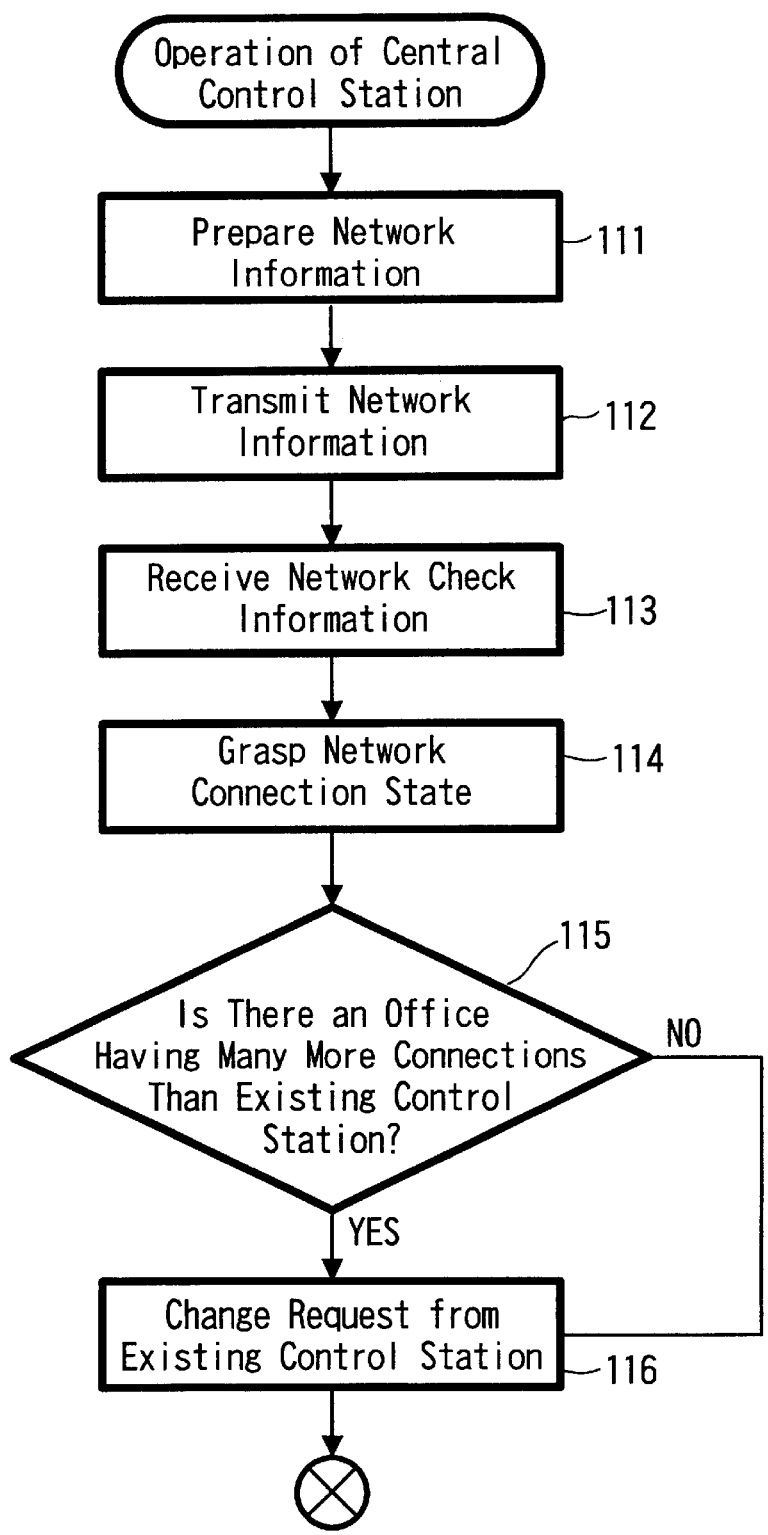
FIG. 9 is a flow chart showing an example of processing at a central control station according to one embodiment of the present invention.
Figure 10:
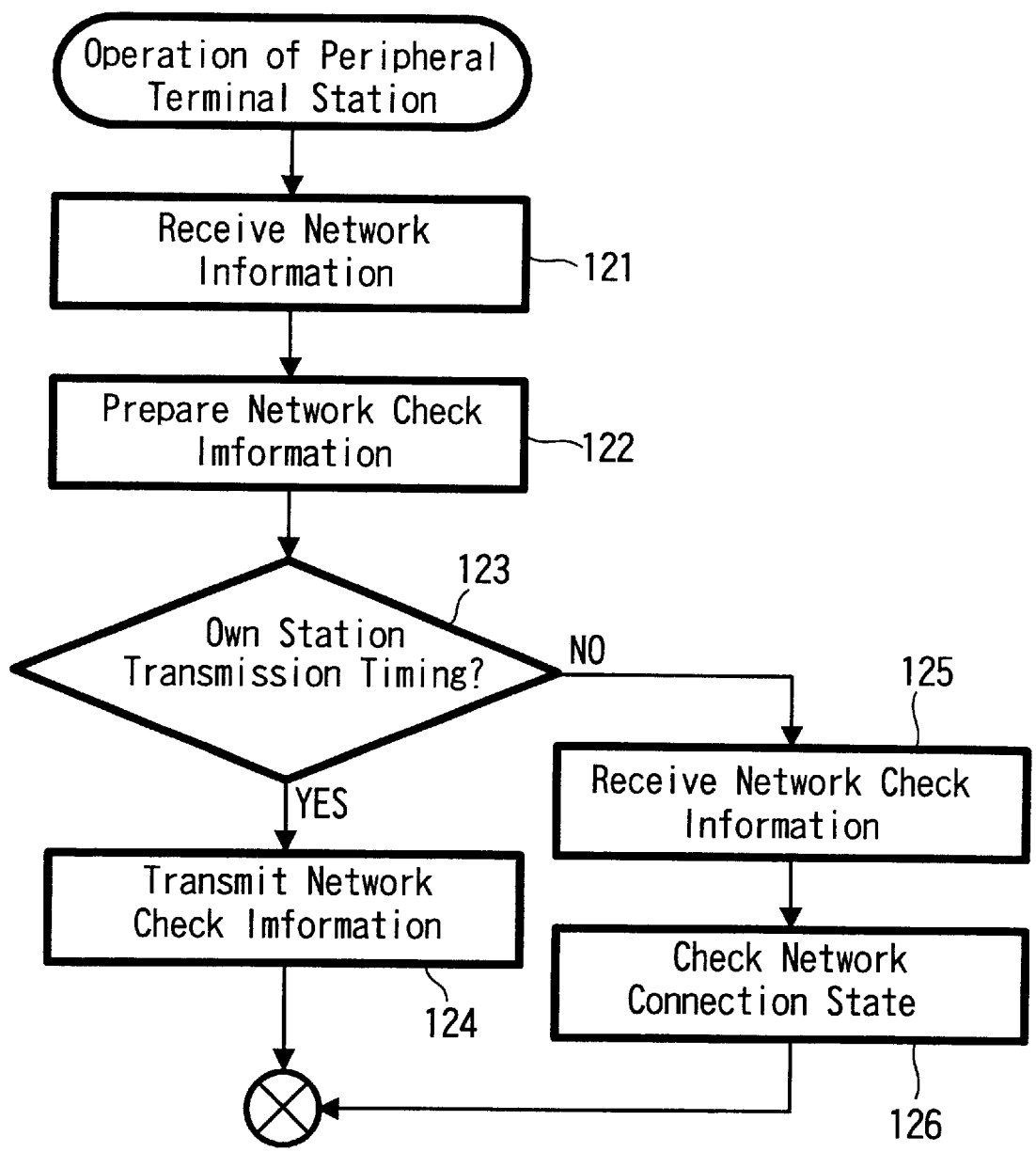
FIG. 10 is a flow chart showing an example of processing at a peripheral terminal station according to one embodiment of the present invention.

Now, processing of each node when such station desires participation into the network will be described with reference to the flow charts in FIG. 8 to FIG. 10. First, processing at a station (that is, seventh and eighth nodes) desiring participation into the network will be described with reference to the flow chart of FIG. 8. Here, processing at the control unit 5 of the wireless transmission apparatus when the wireless transmission apparatus configuring a station desiring participation into the network is powered ON will be described as follows: A specifying process of continuity time for monitoring a communication state at periphery is performed (step 101); and it is judged as to whether or not there exist reception data from any communication network (step 102). Judgments of the reception data from this communication network includes a judgment of the presence or absence of reception of control information from a station operating as a central control station or response information to be transmitted from a terminal station based on the control information. For example, when there exists reception of a frame or node synchronization signal shown in FIG. 4, it is judged that there exists reception of data to be transmitted in a communication network. When it is judged that there exist reception data based on the above judgment, a network ID contained in the received synchronization signal is referred to (step 103); and it is judged as to whether or not such ID matches ID of a network into which an own station desires participation (step 104).

When the ID of the network into which the own station desires participation is matched, as a peripheral terminal station in that network, the station starts transmission and reception operations (step 105). Specifically, processing for transmitting a node synchronization signal or the like is performed at a slot timing for the own station in a node area at a frame period set by the central control station of that network. In addition, in step 104, when it is judged that ID of the network into which the own station desires participation is not matched, it returns to step 102, and it is judged as to whether there exists reception of another signal.

In addition, in step 102, when it is judged that reception data does not exist, it is judged as to whether or not a monitoring time set in step 101 has elapsed (step 106). When the set time has elapsed, it is judged that there does not exist a communication network into which the own station can participate at its periphery; and processing for the own station to be operated as a central control station is performed (step 107). Such processing for the own station to be operated as the central control station includes frame synchronization signal transmission processing for setting a frame configuration shown in FIG. 4 using a channel not used at the periphery, for example. In addition, transmission processing of the node synchronization signal corresponding to the node ID of the own station is performed.

In step 107, after the operation as the central control station has started, when stations existing at the periphery of this station desire participation into a network, a wireless communication network is constructed between these stations desiring such participation.

Next, processing when there is a station which desires participation into the network of the station already operating as the central control station will be described with reference to the flow chart of FIG. 9. First, network information required for controlling the network is prepared at the control unit 5 of a wireless transmission apparatus operating as a central control station (step 111). The network information is required for the network control, is responsible for preparation of information contained in the frame synchronization signal described in FIG. 4, and contains a network ID or the like. The network information is transmitted to a terminal station in the network as a frame synchronization signal under the control of control unit 5 (step 112).

At each terminal station, as described in FIG. 5, a node synchronization signal is transmitted in synchronism with the frame synchronization signal; a node synchronization signal to be transmitted from another station is received, information on a communication state at the own station is prepared; and the information on the communication state is transmitted as a node synchronization signal. The central control station receives the node synchronization signal from each terminal station, thereby receiving network check information therein in the central control station (step 113). Based on the received network check information, the control unit 5 of the central control station grasps a network connection state, and creates a topology map or the like (step 114).

The control unit 5 of the central control station judges whether or not there is a terminal station which is capable of directly making communication with many more stations than those the own station capable of directly making communication (step 115). Based on this judgment, in the case where the own station (central control station) is capable of communicating with most many stations than any other, processing for the own station to be set to a central control station is continued. When it is recognized that there exists a terminal station directly communicating with many more stations than the own station, control station change request information is transmitted to that station (step 116). The control station change request information may be transmitted by using a predetermined area in a frame synchronization signal, for example, or using a data transfer area. Processing at a terminal station after transmission of the control station change request information will be described later. Based on the judgment in step 115, the case where it is recognized that there exists a terminal station capable of directly communicating with many more stations than the own station corresponds to the case where there exists a station desiring new participation into a network. However, even if there exists a station desiring new participation, in the case where the station desiring participation into the network is capable of directly making wireless communication with the central control station, the processing in step 116 is not executed.

Next, processing when a station operating as a terminal station desires new participation into a network will be described with reference to the flow chart of FIG. 10. First, the control unit 5 of a wireless transmission apparatus operating as a terminal station judges network information obtained by receiving a frame synchronization signal or the like to be transmitted from the central control station (step 121). When the network information is received, the terminal station prepares network check information (step 122). The network check information indicating a communication state at an own station or the like is prepared based on information on a network connection state checked by reception of the node synchronization signal at an immediately preceding frame period and temporarily stored in the memory 6.

When the network check information is prepared, it is judged as to whether or not a slot is positioned at a timing at which the own station transmits a node synchronization signal (step 123). When it is judged to be a transmission timing, the network check information is transmitted as a node synchronization signal (step 124).

In step 123, when it is not judged to be a timing of transmitting a node synchronization signal, reception processing of network check information to be transmitted from a remote station is performed (step 125); and the control station 5 checks a network connection state at the own station based on the received information, and causes the state to be temporarily stored in the memory 6 (step 126).

If there exists a station desiring new participation into a network within a range capable of direct wireless communication with the terminal station, the node synchronization signal or the like to be transmitted from that station is received in step 125. In this manner, it is indicated that a station desiring new participation exists based on the network check information prepared in step 122 and transmitted in step 124.

Figure 11:
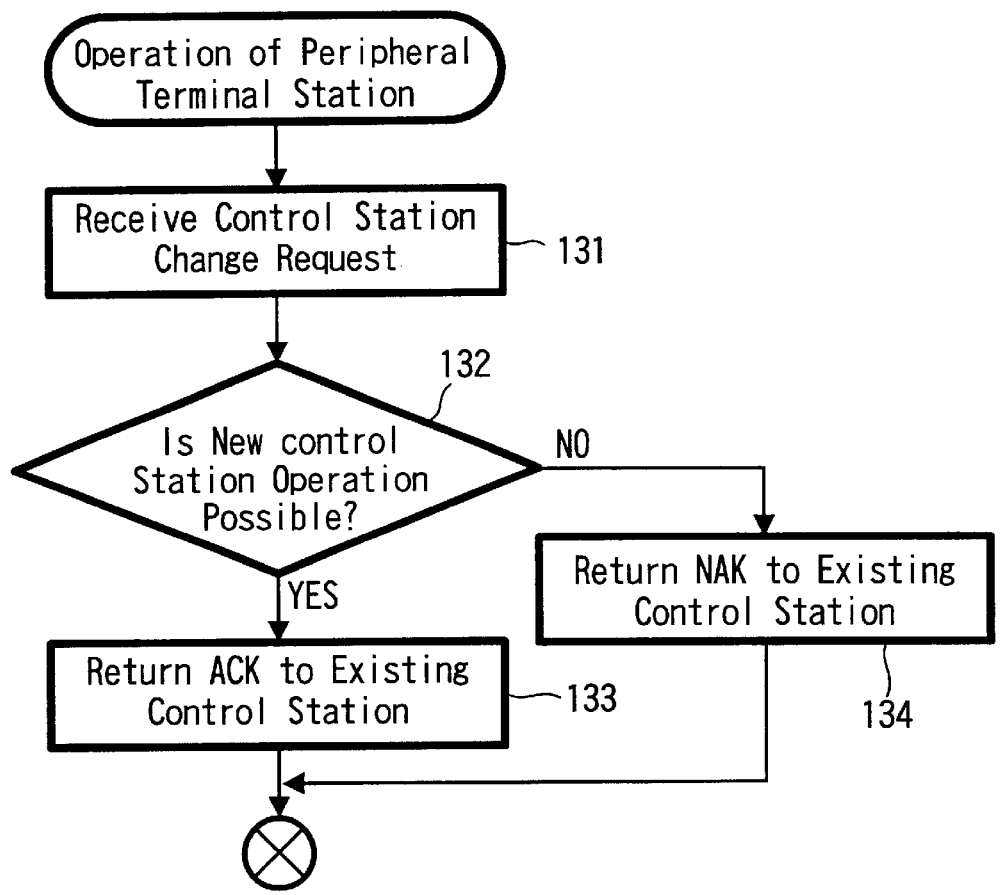
FIG. 11 is a flow chart showing an example of central control station change processing according to one embodiment of the present invention.

Next, processing when a terminal station receives control station change request information transmitted from a central control station (to be transmitted in step 116 of FIG. 9) will be described with reference to the flow chart of FIG. 11. First, when the terminal station receives control station change request information (step 131), it is judged as to whether or not the own station is a station suitable as operating as a central control station (step 132). Judgments as to whether the own station is a station suitable as operating as the central control station include not only a judgment as to whether or not the own station includes functions that make it possible for the own station to operate as the central control station; bet also a judgment as to whether or not the current operating conditions of the own station are suitable as those of the central control station even if the own station includes functions that make it possible for the own station to operate as the central control station. For example, in the case where a wireless transmission apparatus configuring the own station can be driven by stable power supply such as commercially available AC power supply or the like and by a battery (dry battery, secondary battery or the like), it is not judged as being suitable as the central control station when the own station is driven by the battery. In the case where a battery-driven station is selected as a central control station, when a battery for driving that station has expired its service life, there is a possibility that a communication network is not constructed. It is necessary to preferentially select a station using an available commercial AC power supply or the like as a central control station. In addition, when judgment is performed in step 132, it may be judged as to whether or not the own station is a station suitable as a central control station from another factor.

When the own station is judged to be a station suitable as a central control station in step 132, a response signal ACK to permit a control station change request is returned to the central control station (step 133). When the central control station receives this response signal ACK, processing for moving the functions of the central control station is executed. In addition, when the own station is judged to be a station unsuitable as the central control station, a response reject signal NAK to reject a control station change request is returned to the central control station (step 134). When the central control station receives this response reject signal NAK, the central control station interrupts the processing for moving the functions of the control station.

Figure 12:
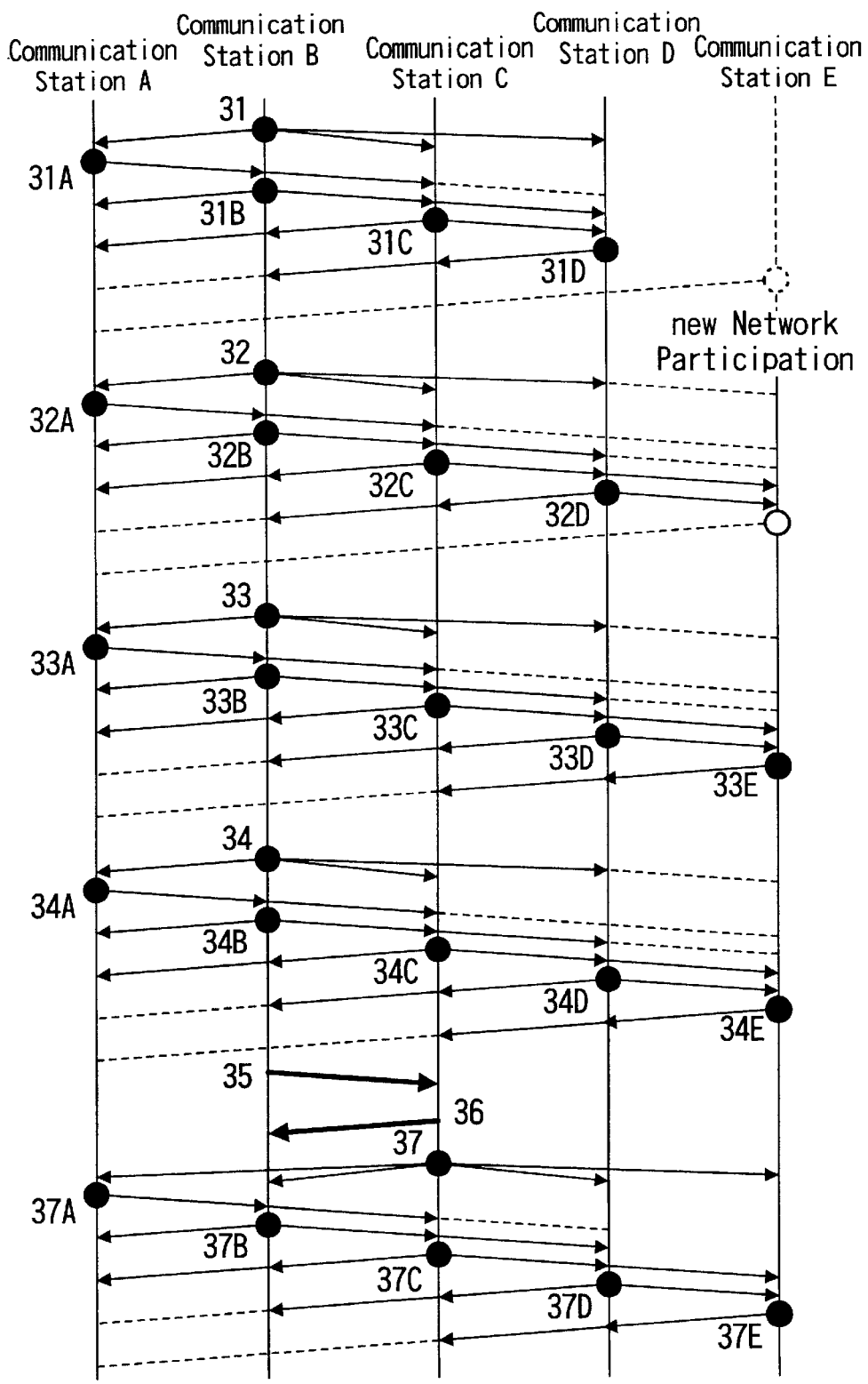
FIG. 12 is an explanatory view showing a state of new participation processing and a state of central control station change processing according to one embodiment of the present invention.

Thus, in FIG. 12, there is shown a communication state when a station desires new participation into an exiting communication network in the case where each station operates in this way. In the example of FIG. 12, there is shown an example of a communication state in which a communication network is composed of four communication stations A, B, C, and D; the communication station B is selected as a control station; and a communication station E incapable of direct wireless communication with communication station B as the control station desires participation into the network. In FIG. 12, there is shown a state in which wireless transmission is directly performed between stations connected by the arrow indicated by solid line. In the figure, a radio signal is not supplied to a station connected by a broken line.

At first, the communication station B transmits a frame synchronization signal 31 to each of the communication stations A, C, and D in the network. After this frame synchronization signal transmission, the communication stations A, B, C, and D in the network transmit node synchronization signals 31A, 31B, 31C, and 31D, respectively. These respective node synchronization signals are received by adjacent stations of each station.

Here, it is assumed that the communication station E desiring new participation into the network is assumed to start its receiving operation at the transmission of the next frame synchronization signal 32. At this time, the communication stations A, B, C, and D in the network transmit node synchronization signals 32A, 32B, 32C, and 32D after the transmission processing of the frame synchronization signal 32. The communication station E can receive the node synchronization signals 32C and 32D from the communication stations C and D.

When the communication station E receives these node synchronization signals 32C and 32D, the own station judges a timing of transmitting a node synchronization signal. After transmission processing of the node synchronization signals 33A, 33B, 33C, and 33D from the respective communication stations A, B, C, and D following the transmission processing of the frame synchronization signal 33 from the communication station B at the next frame period, the communication station E transmits a node synchronization signal 33E at a corresponding timing. At this time, the node synchronization signal 33E to be transmitted from the communication station E is received by the communication stations C and D only.

At the next frame period, in the same state as the above, a frame synchronization signal 34 and node synchronization signals 34A, 34B, 34C, and 34D are transmitted. At this time, the node synchronization signal 34C to be transmitted from the communication station C contains information indicating reception of signals from all the communication stations A to D in the network and the communication station E desiring new participation. When the communication station B as a central control station receives this information, it is judged that the communication station C can receive many more stations (four stations) than the own station (three stations) by the judgement corresponding to the judgement in step 115 of the flow chart in FIG. 9; and the communication station B transmits control station change request information signal 35 to the communication station C. After the communication station C has received this control station change request information signal 35, when it is proper that the communication station C operates as a control station, a response signal 36 is returned to the communication station B. Here, it is assumed that the central control station is changed by returning this response signal. Actually, it may be further necessary to transmit a signal between the communication stations B and C until the central control station has been changed.

When the central control station is changed to the communication station C, the communication station C subsequently transmits a frame synchronization signal 37, and then, the communication stations A, B, C, D, and E transmit node synchronization signals 37A, 37B, 37C, 37D, and 37E, respectively. Thereafter, transmission processing in which the communication station E is added to the network is executed under the control of communication station C.

Figure 6:
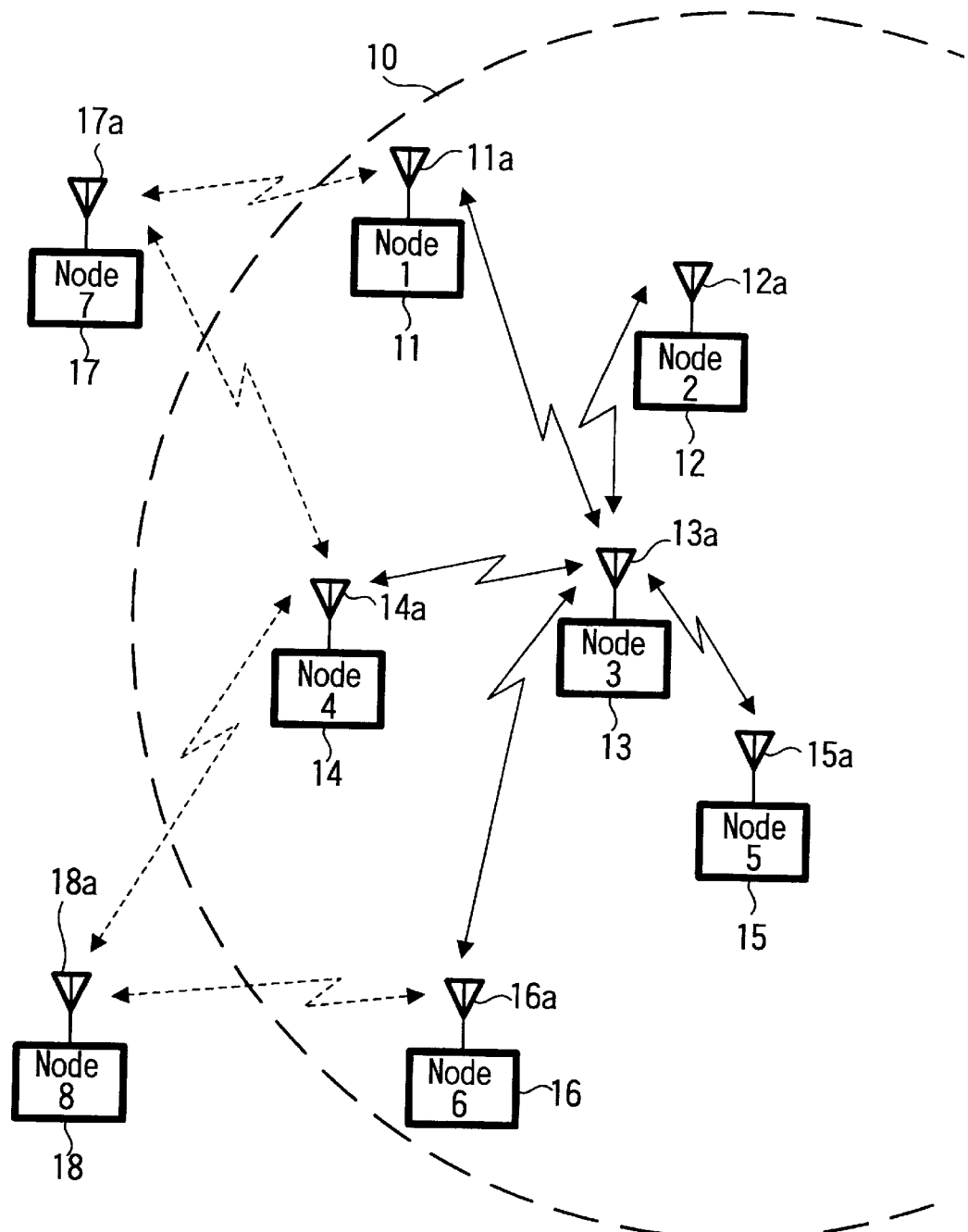
FIG. 6 is an explanatory view showing a transmission example of a connection request from a node outside an area according to one embodiment of the present invention.
Figure 14:
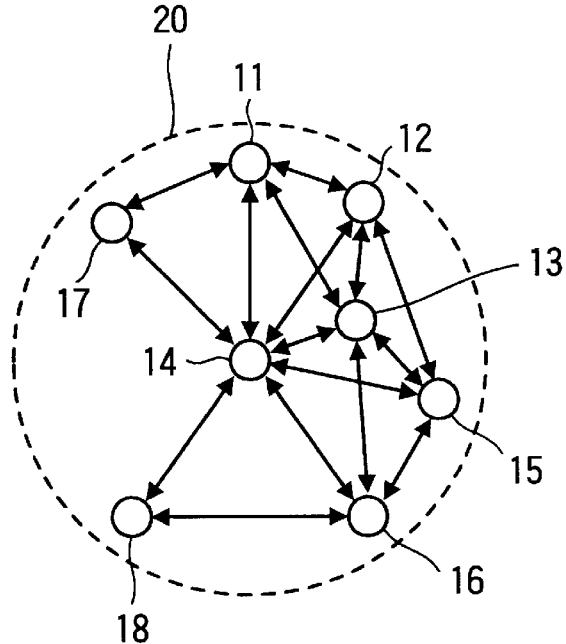
FIG. 14 is an explanatory view showing an example of a topology map after control station change according to one embodiment of the present invention.
Figure 13:
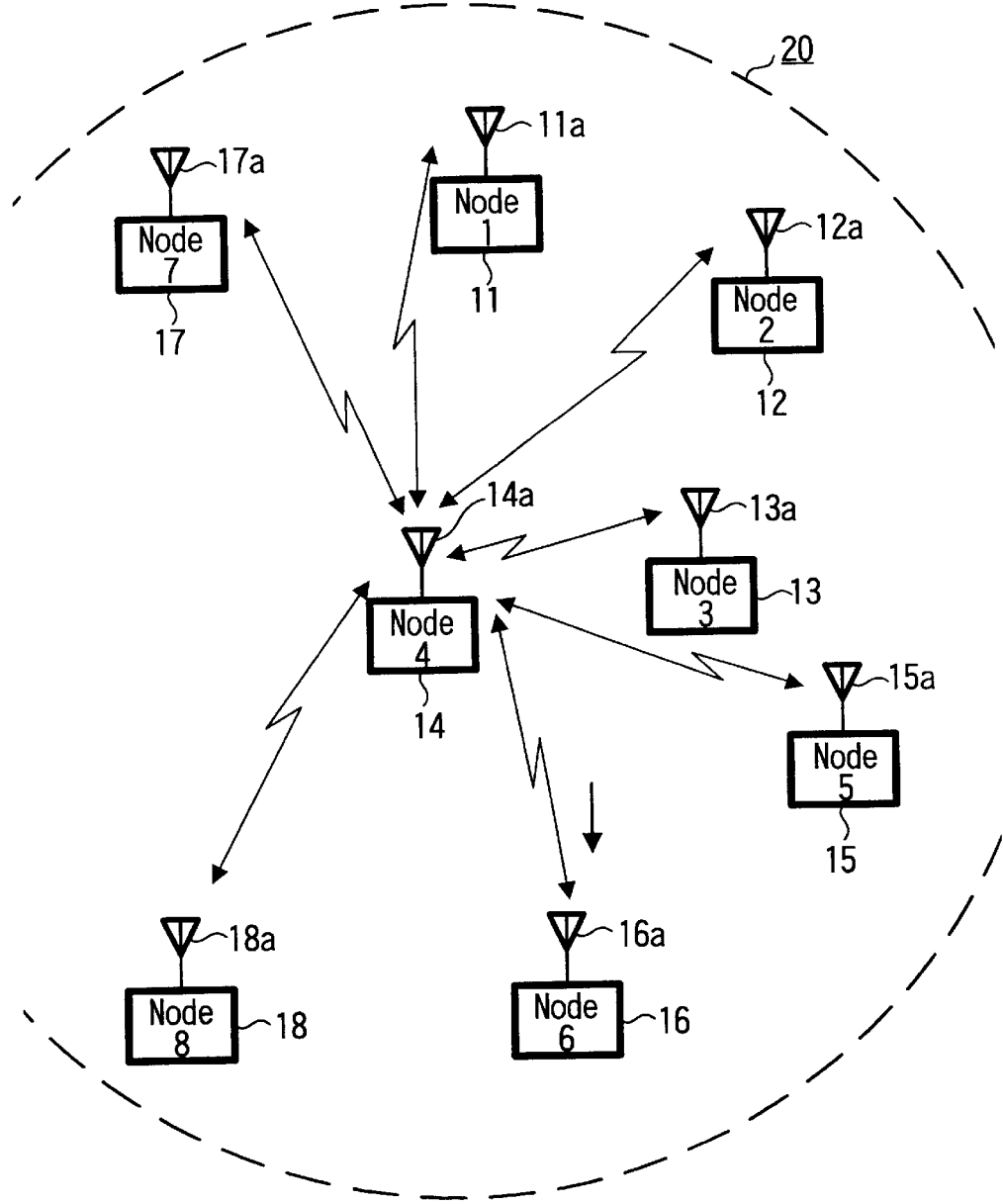
FIG. 13 is an explanatory view showing a network setting example after control station change according to one embodiment of the present invention.

Hereinafter, such change processing will be described by referring to the network construction shown in FIG. 1 and FIG. 6. In the case where the network area 10 is configured with the third node 13 as the central control station, when the seventh and eighth nodes 17 and 18 request network participation, the third node 13 judges that the fourth node 14 is suitable as a central control station. The third node 13 transmits a central control station change request to the fourth node 14, and the fourth node 14 is changed to a central control station. FIG. 13 shows a network construction example that has been changed by such processing. A network area 20 is constructed while the fourth node 14 is capable of directly making wireless communication with all terminal stations. An example of a topology map at this time is shown in FIG. 14.

After the fourth node 14 has been changed to the central control station, in the management area of each frame period, transmission from each node is performed in a state shown in FIG. 15. That is, A to H of FIG. 15 show transmission and reception states at the first node 11 to the eight node 18 in the network similar to FIG. 5 and FIG. 7. At the fourth node 14 selected as the central control station, as shown in D of FIG. 15, a frame synchronization signal is transmitted. This frame synchronization signal is correctly received at all the terminal stations as shown in A to C and E to H of FIG. 15. In a node synchronization area, each node transmits a node synchronization signal sequentially at the slot position assigned to each node, and the adjacent nodes receive the signal. At the respective nodes, information on the reception state of the node synchronization signals at the stations is transmitted; a topology map is created at the central control station; and the communication state in the network is correctly managed.

Thus, the processing according to the preferred embodiments of the present invention is performed, thereby making it possible to automatically construct a star-type wireless network with a central control station being a center. Since a station being optimal according to a communication state at this time is selected as a central control station, a work for presetting a station operating as a central control station is eliminated; and a work for determining a control station or the like is eliminated in configuring a wireless communication network; thereby making it possible to easily construct a network. In particular, even in the case where a station is newly participated in the network, processing for changing a central control station to a station being suitable in consideration of the participating station is performed, thereby making it possible to cope with an increase or decrease in terminal stations configuring a communication network.

In addition, the wireless transmission apparatuses configuring all the stations can be handed as a similar equipment, so that there is no need for including only a central control station in a specific equipment configuration or processing such as specific control program operation.

Further, if a desired network does not exist as the processing for participation into a network, processing for an own station to be set to a network control station is performed, thereby making it possible to arbitrarily configuring a wireless communication network without a control station position and a service area of the network being limited in advance.

The frame configuration or the like described in the above mentioned embodiment of the present invention is merely provided as an example and it is not necessarily limited thereto. In addition, the construction of wireless transmission apparatuses is not limited to the above mentioned example. The above mentioned communication control processing is applicable to a communication network composed of wireless transmission apparatuses adopted to a variety of wireless transmission systems.

According to a wireless transmission control method described in claim 1, a station suitable to control each communication station in a wireless network is automatically selected as a central control station; and the wireless network is automatically and properly configured.

According to a wireless transmission control method described in claim 2, in the invention according to claim 1, the central control station sets a frame period for executing wireless transmission in the wireless network; the central control station judges a station with which another terminal station is capable of direct wireless communication based on management information transmitted from each terminal station in the management information transmission region in the set frame period; thereby making it possible to easily judge a station suitable as the central control station.

According to a wireless transmission control method described in claim 3, in the invention according to claim 1, after the central control station has transmitted central control station change information to a terminal station to be changed to the central control station, when the terminal station to be changed returns a response signal, processing for changing the central control station is executed. In this manner, only a station suitable as the central control station is selected and changed, preventing a terminal station unsuitable as the central control station from being accidentally set to the central control station.

According to a wireless transmission control method described in claim 4, if there exists no communication station operating as the central control station in the neighborhood, an own station is automatically set to the central control station, thereby making it possible to automatically configure a wireless network.

According to a wireless transmission control apparatus as claimed in claim 5, when this transmission control apparatus operates as a central control station, when it is judged as to the presence of a station being more suitable to be the central control station than the own station, processing for moving a control function to that station is executed; and control processing for always configuring an proper wireless network is performed.

According to a wireless transmission control apparatus described in claim 6, in the invention according to claim 5, there is provided the timing setting means for setting a frame period for executing wireless transmission in the wireless network; the communication means transmits a synchronization signal of a frame period set by the timing setting means and receives the information concerning a wireless communication state at a terminal station in the management information transmission region within the frame period. In this manner, the presence of a station suitable to be a central control station can be judged at every frame period with a simple structure.

According to a wireless transmission control apparatus described in claim 7, in the invention as claimed in claim 5, when the communication means transmits the control station change information to a terminal station for moving a function for transmitting control information and receives a response signal from this terminal station, the control means performs processing for moving the function for transmitting control information. In this manner, after acknowledgment has been obtained from a remote transmission apparatus, the processing for moving the functions of the control station is performed reliably.

According to a wireless transmission control apparatus as claimed in claim 8, if there exists no communication functioning as a central control station in the neighborhood, processing for the own station to be automatically set to a central control station is executed; and a wireless network is automatically configured under the control of this wireless transmission control apparatus.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A wireless communication control method for controlling wireless communication access between a plurality of terminal stations via wireless transmission of a control signal from one terminal station operating as a central control station to another terminal station, comprising the steps of:

causing the central control station to set a frame period for executing the wireless communication in a wireless network and to set network check information in a control area of the frame period;

selecting a terminal station as the central control station and receiving the network check information in the control area of the frame period from each of the plurality of terminal stations capable of directly making wireless communication;

grasping a network connection state and producing a topology map based on the received network check information;

detecting whether one of the plurality of terminal stations is capable of making wireless communication with more terminal stations than the terminal station selected as the central control station based on the produced topology map; and causing the terminal station selected as the central control station to perform processing for changing the detected one of the plurality of terminal stations to be the central control station.

2. The wireless communication control method according to claim 1, comprising the further steps of:

causing the central control station to set a frame period for executing the wireless communication in a wireless network; and causing the central control station to judge a communication state of a terminal station based on management information transmitted from each terminal station in a management information transmission region in the set frame period.

3. The wireless communication control method according to claim 1, wherein when the central control station transmits central control station change information to the detected one of the plurality of terminal stations to be changed to be the central control station a response signal is returned, the processing for changing the central control station is executed.

4. A wireless transmission control apparatus for controlling wireless communication at a terminal station in a network formed of a plurality of terminal stations, the wireless transmission control apparatus comprising:

communicating means for wireless-transmitting control information for controlling transmission of a radio signal from the terminal station and receiving a wireless signal transmitted from an other terminal station; and timing setting means for setting a frame period for executing wireless transmission in the wireless and setting network check information in a control area of the frame period;

control means for judging a wireless communication state at the terminal station in the network based on a received predetermined signal by the communicating means including the network check information in the control area of the frame period and for grasping a network connection state and producing a topology map based on the received network check information, wherein when, based on the produced topology map, one of the plurality of terminal stations is capable of making wireless communication with more terminal stations than the terminal station, control information is transmitted to the one of the plurality of terminal stations to transfer a network control function thereto.

5. The wireless transmission control apparatus as claimed in claim 4, further comprising:

timing setting means for setting a frame period for executing wireless transmission in the wireless network, wherein said communicating means includes means for transmitting a synchronization signal of a set frame period by the timing setting means and for receiving information concerning a the wireless communication state at the terminal station in a management information transmission region in the frame period.

6. The wireless transmission apparatus as claimed in claim 4, wherein when the communicating means transmits the control information to the one terminal station to which the network control function is to be transferred and receives a response signal therefrom, the control means transfers the network control function to the one terminal station.

* * * * *